(12) United States Patent
Yamamoto et al.

(10) Patent No.: US 7,337,689 B2
(45) Date of Patent: Mar. 4, 2008

(54) BALL SCREW MECHANISM, MACHINING METHOD FOR JOINT BETWEEN NUT AND BALL CIRCULATION PIECE, AND ELECTRIC POWER STEERING DEVICE

(75) Inventors: Yasuharu Yamamoto, Toyota (JP); Sentarou Sugita, Nagoya (JP)

(73) Assignee: JTEKT Corporation, Osaka-shi (JP)

(*) Notice: Subject to any disclaimer, the term of this patent is extended or adjusted under 35 U.S.C. 154(b) by 299 days.

(21) Appl. No.: 10/954,174

(22) Filed: Oct. 1, 2004

(65) Prior Publication Data

US 2005/0076733 A1 Apr. 14, 2005

(30) Foreign Application Priority Data

Oct. 14, 2003 (JP) ............................. 2003-353195

(51) Int. Cl.
*F16H 1/24* (2006.01)
*F16H 55/02* (2006.01)
(52) U.S. Cl. .................................. 74/424.75; 74/424.87
(58) Field of Classification Search ............. 74/424.82, 74/424.86, 424.87, 424.75; 409/66
See application file for complete search history.

(56) References Cited

U.S. PATENT DOCUMENTS 4,177,690 A * 12/1979 Klinkenberg ............ 74/424.86
5,005,436 A * 4/1991 Brusasco ................ 74/424.87
6,092,434 A * 7/2000 Matsumoto et al. ...... 74/424.86

FOREIGN PATENT DOCUMENTS

JP 11-270648 10/1999

* cited by examiner

*Primary Examiner*—Richard Ridley
*Assistant Examiner*—James Pilkington
(74) *Attorney, Agent, or Firm*—Oblon, Spivak, McClelland, Maier & Neustadt, P.C.

(57) ABSTRACT

A ball screw mechanism including a screw shaft with a screw groove formed on an external surface, a nut with a screw groove formed on an internal surface, and plural balls held in the grooves. A ball circulation piece is fit in a window portion in the nut and has a circulation groove for circulating the balls. The screw groove of the nut and the circulation groove are machined by moving a tool of a diameter equal to or larger than the diameter of the balls, along the screw groove of the nut so that a step is eliminated at a joint therebetween. The infeed depth of the tool is gradually changed as the tool is moved toward the joint so that boundary lines between a machined surface and a non-machined surface on flanks of the screw groove of the nut extend at an acute angle to one another.

20 Claims, 4 Drawing Sheets

I-I Cross-section

II-II Cross-section

III-III Cross-section

BALL SCREW MECHANISM, MACHINING METHOD FOR JOINT BETWEEN NUT AND BALL CIRCULATION PIECE, AND ELECTRIC POWER STEERING DEVICE

INCORPORATION BY REFERENCE

This application is based on and claims priority under 35 U.S.C. 119 with respect to Japanese Application No. 2003-353195 filed on Oct. 14, 2003, the entire content of which is incorporated herein by reference.

BACKGROUND OF THE INVENTION

1. Field of the Invention

The present invention relates to a ball screw mechanism composed of a screw shaft with a male screw groove formed on an external surface thereof, a nut with a female screw groove on an internal surface thereof, plural balls held in the both screw grooves of the screw shaft and the nut, and a ball circulation piece fit in a window portion formed in the nut for circulating the balls. It also relates to a machining method for a joint between the nut and the ball circulation piece and further to an electric power steering device employing the ball screw mechanism.

2. Discussion of the Related Art

In an electric power steering device (hereafter referred to as "EPS") of a lack assist type, a ball screw mechanism is used for transmitting the rotational power of an electric motor to a lack shaft. The ball screw mechanism used in the EPS is constituted as of an internal circulation type wherein plural balls are circulated inside the nut as described in Japanese unexamined, published patent application No 11-270648.

In the ball screw mechanism of the internal circulation type, as shown in FIG. 2, a male screw groove 16 and a female screw groove 22 along which plural balls 21 are guided and rolled are helically formed on a lack shaft 11 and a nut 20, respectively. Each time moving along the female screw groove 22 through one turn, each ball 21 is led to a circulation groove 24 which is formed on a ball circulation piece 25 secured to the nut 20 for bridging adjoining groove segments or portions in the axial direction of the female screw groove 22, and is circulated by overleaping a screw thread which is formed between adjoining groove portions in the axial direction of the male screw groove 16.

The aforementioned ball circulation piece 25 fixed to the nut 20 is made separately from the nut 20 and is integrated with the nut 20 by being fit in a window portion of an elongate hole, which is formed to bridge the adjoining groove portions of the female screw groove 22 of the nut 20. Because of errors in machining and assembling, simply fitting the ball circulation piece 25 in the window portion of the nut 20 causes a step to be generated at each of joints between the circulation groove 24 and the female screw groove 22. As being caught by the step, the balls cannot move smoothly, which causes the generation of noise and vibration.

For this reason, it has been a practice to perform a machining for eliminating the steps at the joints between the circulation groove 24 and the female screw groove 22. FIGS. 7 and 8 show one of joint portions or areas (E) between the circulation groove 24 and the female screw groove 22 in an enlarged scale. As shown by the solid line, the joint (A) has the step thereat. Therefore, heretofore, the step at the joint (A) has been eliminated by using a ball end mill (K) having a cutting portion of a diameter equal to or larger than that of the balls 21. That is, as shown in FIG. 8, the ball end mill (K) is infed into the female screw groove 22 by a target infeed depth (t) which is necessary to eliminate the step at the joint (A) and then is moved toward the circulation groove 24 along the center line of the female screw groove 22 thereby to machine the joint area (E) between the female screw groove 22 and the circulation groove 24.

However, when the joint (A) is machined with the ball end mill (K) given the target infeed depth (t), the ball end mill (K) is sharply infed at an infeed starting position. As the machining starting portion is viewed from over the female screw groove 22 as shown in FIG. 7, boundary lines (D) between a finished surface (B) and an unfinished surface (C) lie to extend laterally from a groove bottom toward flanks at both sides of the female screw groove 22, and the angle ($\alpha$) made by the boundary lines (D) becomes an obtuse angle. Where the angle ($\alpha$) made by the boundary lines (D) becomes such an obtuse angle, the contact points of each ball 21 with the female screw groove 22 changes abruptly at the boundary lines (D) when each ball 21 moves within the joint area (E) between the circulation groove 24 and the female screw groove 22. The abrupt change of the contact points of each ball 21 with the female screw groove 22 undesirably causes noise and vibration to be generated during the operation of the ball screw mechanism.

SUMMARY OF THE INVENTION

Accordingly, it is a primary object of the present invention to provide an improved ball screw mechanism and an improved method of machining a joint area between a nut and a ball circulation piece which mechanism and method are capable of preventing the contact points of each ball with a female screw groove of the nut from changing abruptly at the boundary lines between an unfinished surface of the female screw groove and a finished surface of the same which is formed by a machining for eliminating a step at each of joints between a circulation groove of the ball circulation piece and the female screw groove, whereby noise and vibration can be prevented from being generated during the operation of the ball screw mechanism.

Briefly, according to the present invention, there are provided a ball screw mechanism and a method of machining a joint area between a nut and a ball circulation piece. The ball screw mechanism comprises a screw shaft with a male screw groove formed on an external surface thereof; the nut with a female screw groove formed on an internal surface thereof; plural balls held in the male and female screw grooves of the screw shaft and the nut; and a ball circulation piece fit in a window portion formed in the nut and having a circulation groove formed thereon for circulating the balls. The female screw groove and the circulation groove are machined by moving a tool of a diameter equal to or larger than the diameter of the balls, along the female screw groove so that a step is eliminated at a joint between the female screw groove of the nut and the circulation groove of the ball circulation piece. The infeed depth of the tool is gradually changed as the tool is moved toward the joint so that an acute angle is made by boundary lines between a finished surface and an unfinished surface on both flanks of the female screw groove.

With the aforementioned construction, the contact points of each ball with the female screw groove gradually change when each ball moves within the joint area between the female screw groove and the circulation groove, so that vibration and noise are prevented from being generated during the circulation of the balls. In the machining method, by gradually changing the infeed depth of the tool into the nut, the acute angle is formed by the boundary lines between the finished surface and the unfinished surface on the flanks of the female screw groove. Thus, as each ball moves within the joint area between the female screw groove and the circulation groove, the contact potions of each ball with the female screw groove changes gradually, so that vibration and noise can be prevented from being generated during the circulation of the balls.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

Figure 3:
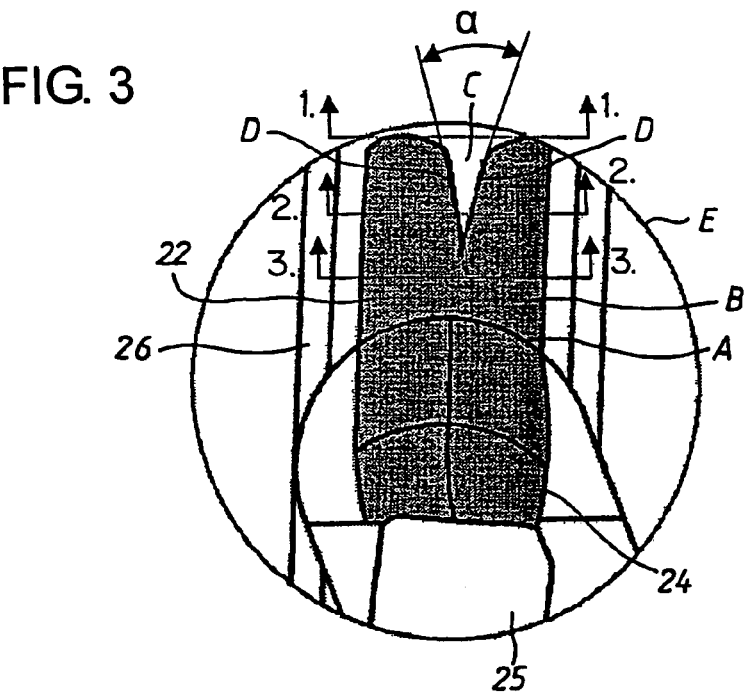
FIG. 3 is a circular fragmentary enlarged plan view showing a finished joint area between a female screw groove and a circulation groove as delimited by line IV-IV in FIG. 4.
Figure 4:
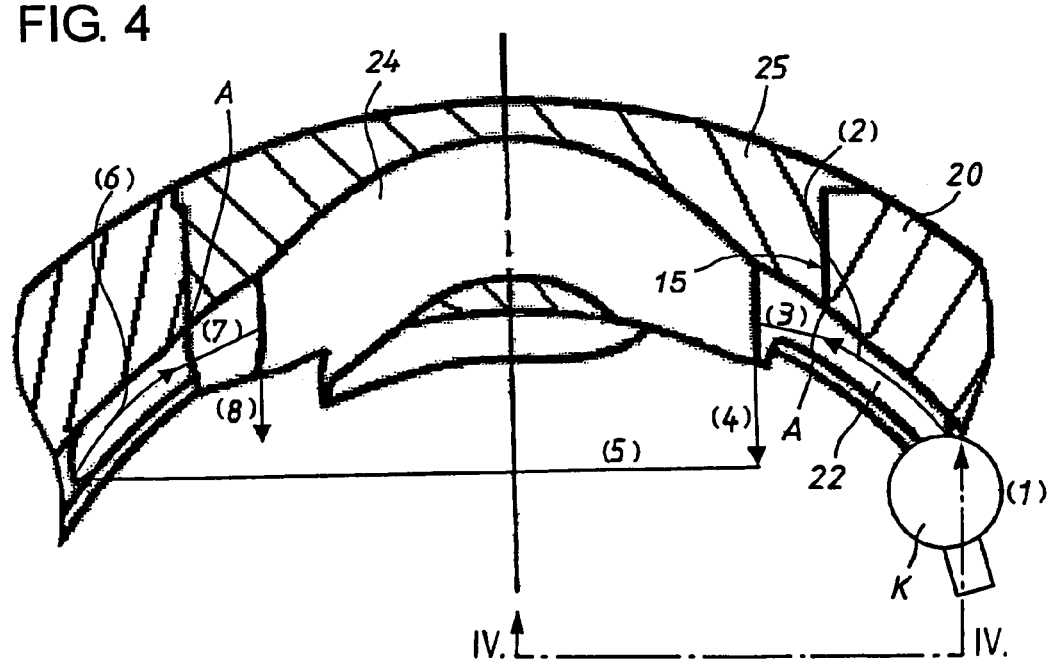
FIG. 4 is a fragmentary cross-sectional explanatory view for showing the order in machining joint areas between the female screw groove and the circulation groove.
Figure 6A:
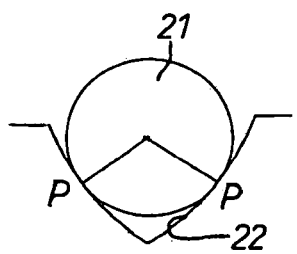
Figure 6B:
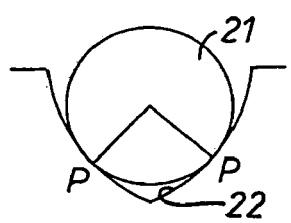
Figure 6C:
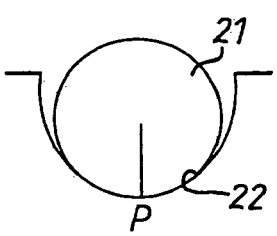
Figure 7:
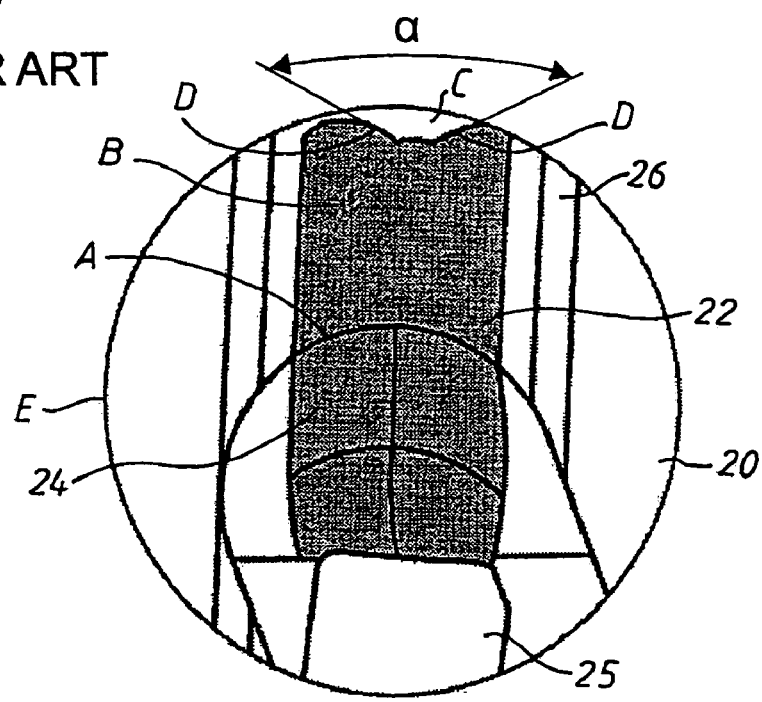
Figure 8:
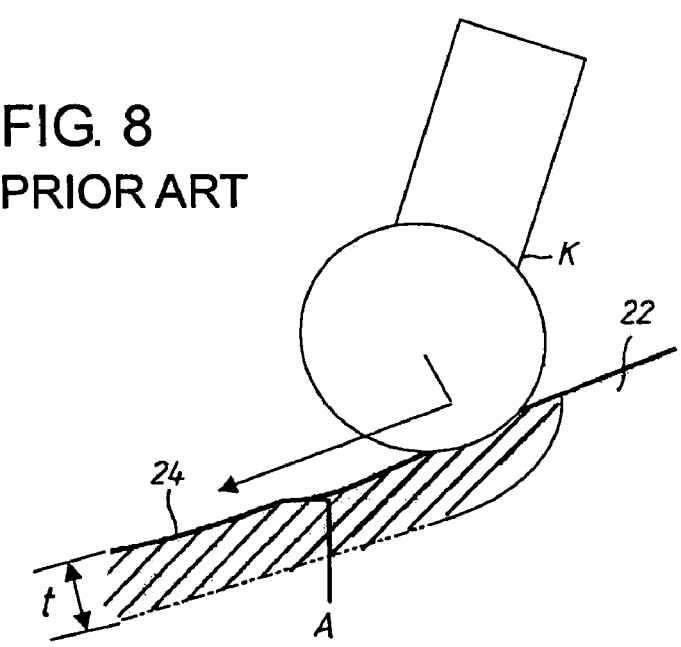

FIGS. 6(a)-6(c) are fragmentary cross-sectional views respectively taken along the lines I-I, II-II and III-III in FIG. 3 for showing the contact state of each ball with a finished female screw groove;

FIG. 7 is a circular fragmentary enlarged plan view showing a finished joint area between a female screw groove and a circulation groove in a prior art ball screw mechanism delimited in a manner similar to line IV-IV in FIG. 4 but with respect to the prior art ball screw mechanism; and FIG. 8 is a fragmentary cross-sectional explanatory view of a joint area for showing the state that the female screw groove and the circulation groove are machined with a ball end mill for use in the prior art ball screw mechanism.

DETAILED DESCRIPTION OF THE PREFERRED EMBODIMENT

Figure 1:
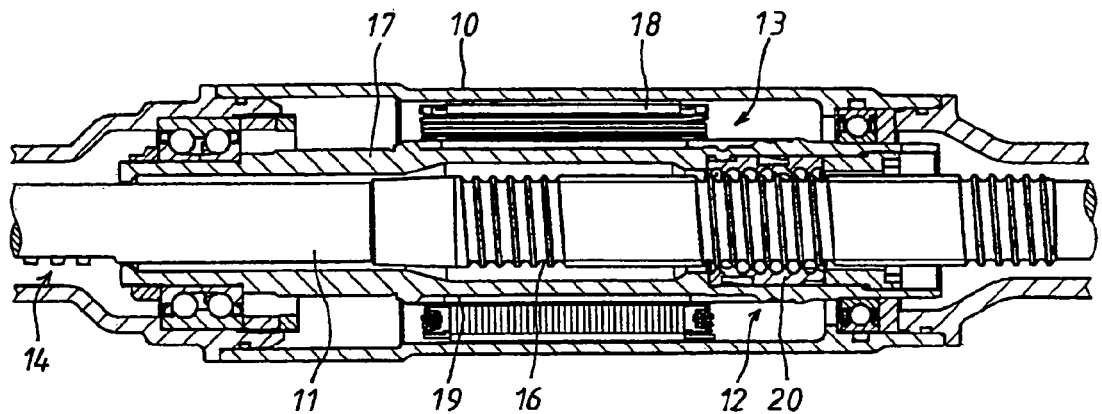
FIG. 1 is a longitudinal sectional view of a part of an electric power steering device in one embodiment according to the present invention.

Hereafter, an embodiment according to the present invention will be described with reference to the accompanying drawings. FIG. 1 shows an electric power steering device in the embodiment. In the electric power steering device, a rack shaft (screw shaft) 11, a ball screw mechanism 12 and an electric motor 13 are assembled in a housing 10 which is mounted on a vehicle body (not shown) to be laid in the left-right direction of a vehicle.

Rack teeth 14 are formed on a lateral surface at one end of the rack shaft 11 and are in meshing with a pinion (not shown) to which a steering force is transmitted from a steering handle (not shown). Thus, when the pinion is rotated, the rack shaft 11 is moved in the axial direction thereof (i.e., the left-right direction as shown in FIG. 1) thereby to steer steerable road wheels, e.g., front wheels (not shown). In addition to the rack teeth 14, the rack shaft 11 has formed thereon a male screw groove 16 constituting the screw shaft 11 of the ball screw mechanism 12.

The electric motor 13 is provided for supplying an axial assist force to the rack shaft 11 through the ball screw mechanism 12 and is composed of a rotor 17 and a stator 18. The rotor 17 takes the shape of an annular cylinder, and the rack shaft 11 extends through an annular bore of the rotor 17 in coaxial alignment. A plurality of plate-like permanent magnets 19 are secured on a circumferential surface of the rotor 17, and a stator 18 is arranged on an internal surface of the housing 10 to face the permanent magnets 19. The stator 18 is provided with plural coils, and thus, the rotor 17 is rotated by applying to the permanent magnets 19 the magnetic flux which is generated upon the application of an electric current to the coils. A nut 20 composing the aforementioned ball screw mechanism 12 is secured on the internal surface of the rotor 17 and is rotatable together with the rotor 17.

Figure 2:
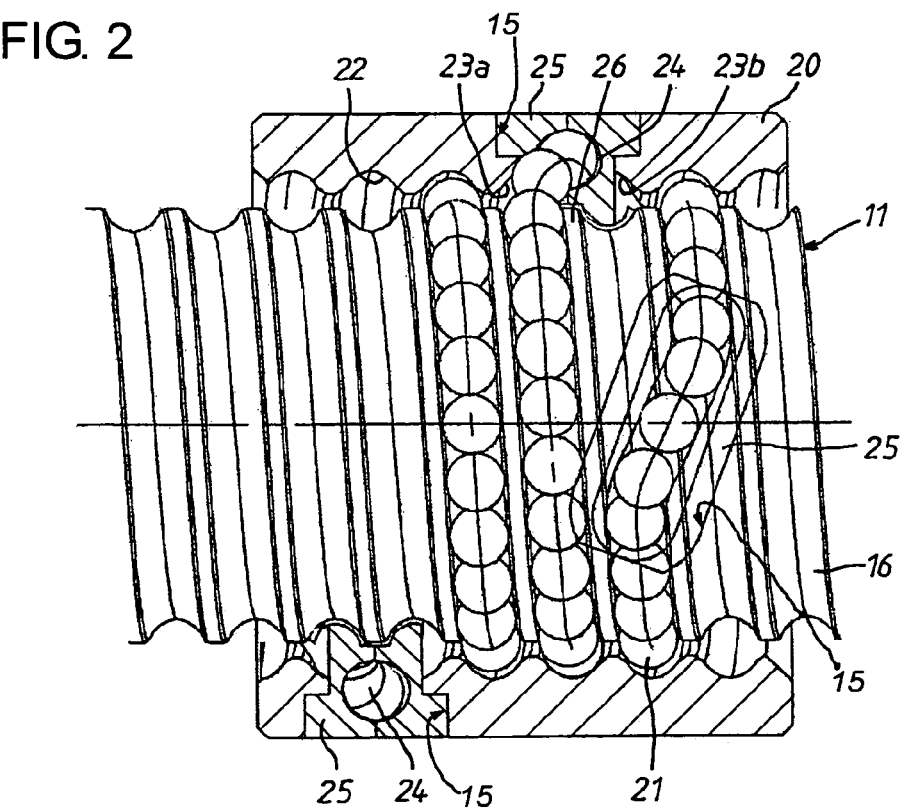
FIG. 2 is a fragmentary enlarged longitudinal sectional view of a ball screw mechanism in the embodiment.

As shown in FIG. 2, the ball screw mechanism 12 for steering the steerable road wheels of a motor vehicle (not shown) through the rack shaft 11 is composed primarily of the rack shaft 11, the nut 20 and a plurality of balls 21. A male screw groove (or first screw groove) 16 and a female screw groove (or second screw groove) 22 along which the balls 21 are rolled are helically formed respectively on the rack shaft 11 and the nut 20. The male screw groove 16 and the female screw groove 22 are formed to take a Gothic arc shape in cross-section. In the Gothic arc shape, flanks of each groove are formed by two arcs which are different in their arc centers but are identical in curvature. Four (three only illustrated) elongate apertures (window portions) 15, each of which extends over adjoining groove segments or portions 23a, 23b in the axial direction of the female screw groove 22, are formed in the circumferential portions of the nuts 20 respectively at four angular positions which are different in ninety degrees (90°) from one another. Four (three only illustrated) ball circulation pieces 25 are fit respectively in the four elongate apertures 15 and each has formed thereon a circulation groove 24 bridging the adjoining groove portions 23a, 23b. The circulation groove 24 formed on each ball circulation piece 25 partly takes the form of a tunnel and guides the balls 21 as it wraps tip the balls 21, so that the balls 21 are circulated by overleaping a screw thread 26 of the male screw groove 16 extending between the adjoining groove portions 23a, 23b. Thus, each of the balls 21 is circulated to be returned to the same groove segment or portion on the female screw groove 22 after one turn around the screw shaft 11. Further, within the circulation groove 24 of each ball recirculation piece 25, each ball 21 is relieved of the constraint by the male screw groove 16 and does not act to transfer any force between the screw shaft 11 and the nut 20. For this reason, the circulation groove 24 is formed by a groove whose cross-section is formed by a single arc differently from the male screw groove 16 and the female screw groove 22.

Figure 5:
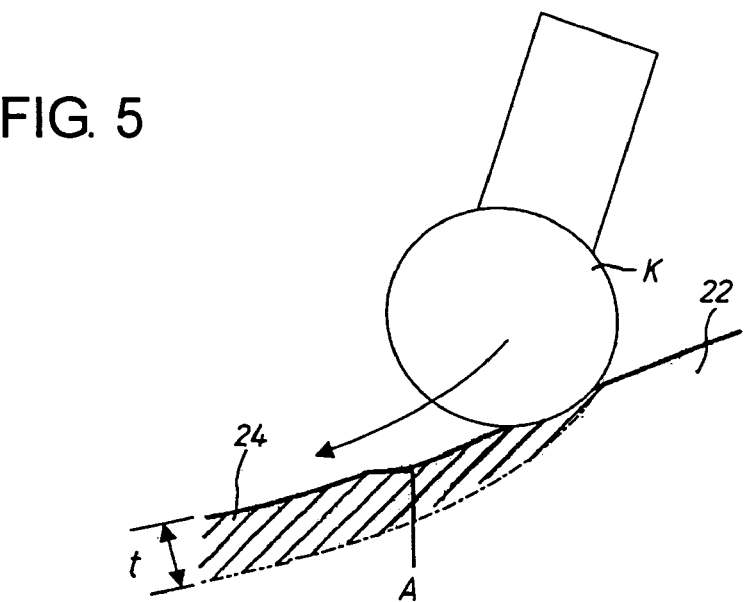
FIG. 5 is a fragmentary cross-sectional explanatory view of the joint area for showing the state that the female screw groove and the circulation groove are machined with a ball end mill.

FIG. 3 is a fragmentary plan view showing one of the joint areas (E) between the female screw groove 22 and the circulation groove 24 of each ball circulation piece 25 in an enlarged scale. An angle (α) that is made by two boundary lines (D), which form a V-shape, between a finished surface (B) and an unfinished surfaces (C) on the both flanks of the female screw groove 22 is made to be an acute angle in order to eliminate a step at the joint (A) between the female screw groove 22 and the circulation groove 24. In machining the joint area (E), a ball end mill (K) shown in FIGS. 4 and 5 which is equal to or larger in diameter than the balls 21 is employed in order to eliminate the step at the joint (A) between the female screw groove 22 and the circulation groove 24. As shown in FIG. 5, the ball end mill (K) is moved along the female screw groove 22 (i.e., along the center line of the female screw groove 22) and is gradually increased in infeed depth as it goes toward the joint (A), whereby the angle (α) made by the boundary lines (D) becomes the acute angle.

Next, with reference to FIGS. 4 and 5, description will be made regarding a method of eliminating the step at the joint (A) between the female screw groove 22 and the circulation groove 24. As aforementioned, used for the machining is the ball end mill (K) having the diameter which is not smaller than the diameter of the balls 21, that is, which is equal to or larger than the diameter of the balls 21. Since the circulation groove 24 takes the shape of a tunnel, the joints (A) at opposite ends of each ball circulation piece 25 are machined one after the other by feeding the ball end mill (K) in the following order of tool path segments (1) to (8) as shown in FIG. 4.

(1) The ball end mill (K) is positioned at a machining start position close to one joint (A) between one of the adjoining groove portions 23a, 23b of the female screw groove 22 and the circulation groove 24.

(2) Then, the ball end mill (K) is moved along the center line of the female screw groove 22 toward the circulation groove 24. During this movement, the infeed depth of the ball end mill (K) is gradually increased so that the infeed depth just before the joint (A) can reach a target infeed depth (t) which is able to eliminate the step at the joint (A).

(3) When the target infeed depth (t) is attained, further infeeding is discontinued, and thereafter, the ball end mill (K) is moved along the center line of the female screw groove 22 until it is moved past the joint (A), whereby the step at the joint (A) is eliminated.

(4) The feed movement is halted within the circulation groove 24 past the joint (A), the ball end mill (K) is escaped from within the circulation groove 24.

(5) Like (1) above, the ball end mill (K) is positioned at another machining start position close to the other joint (A).

(6) Then, the ball end mill (K) is moved along the center line of the female screw groove 22 toward the circulation groove 24. During this movement, the infeed depth of the ball end mill (K) is gradually increased so that the infeed depth just before the other joint (A) can reach the same or another target infeed depth (t) which is able to eliminate the step at the other joint (A).

(7) When the target infeed depth (t) is attained, further infeeding is discontinued, and thereafter, the ball end mill (K) is moved along the center line of the female screw groove 22 until it is moved past the other joint (A) close to the other end portion of the circulation groove 24, whereby the step is eliminated at the other joint (A).

(8) The feed movement is halted within the circulation groove 24, and the ball end mill (K) is escaped from within the circulation groove 24 to complete the machining.

Preferably, in machining each of the joints (A), the end portion of the circulation groove 24 is slightly machined. Thus, the end portions of the female screw groove 22 and the circulation groove 24 which adjoin through each joint (A) therebetween can be machined as if they form a single groove surface having no step. However, if it is possible to control the infeed depth of the ball end mill (K) to eliminate the step at each joint (A), it is not necessarily required to machine each end portion of the circulation groove 24. Other joints (A) between each of other ball circulation pieces 25 and the female screw groove 22 are machined in the same manner as described above.

As a consequence of the machining, the cross-sections along the lines I-I, II-II and III-III in FIG. 3 of the female screw groove 22 within each of the joint areas (E) are formed respectively as shown in FIGS. 6(a), 6(b) and 6(c). Since the ball end mill (K) is given little infeed depth at the machining start portion, each ball 21 comes to contact with the female screw groove 22 at two spaced points (P) on the flanks of the female screw groove 22, as shown in FIG. 6(a). As each ball 21 approaches toward the joint (A), the distance between the two contact points (P) of each ball 21 with the female screw groove 22 is made narrower as shown in FIG. 6(b). This is because in the machining, the infeed depth of the ball end mill (K) is gradually increased as the ball end mill (K) is moved toward the joint (A). In the machining, the target infeed depth (t) is reached right before the joint (A), and the ball end mill (K) is infed to the bottom surface of the female screw groove 22 to make the cross-section of the same a single arc. Therefore, each ball 21 right before the joint (A) comes to contact with the female screw groove 22 at one contact point (P) which is at the bottom, center point of the female screw groove 22, as shown in FIG. 6(c). In this manner, because each ball 21 reaches the joint (A) as the contact of each ball 21 with the female screw groove 22 is gradually changed from the two points (P) at the both flanks of the female screw groove 22 to the single point (P) at the bottom of the female screw groove 22, each ball 21 can move smoothly through the joint area (E) between the female screw groove 22 and the circulation groove 24.

For the purpose of escaping the ball end mill (K) from within the circulation groove 24, the boundary lines (D) between the finished surface (B) and the unfinished surface (C) on each end of the circulation groove 24 are formed to extend in a direction transverse to the circulation groove 24, as best shown in FIG. 3. However, the transverse boundary lines (D) do not make a cause of generating vibration and noise because within the circulation groove 24, each ball 21 neither suffers constraint by the male screw groove 16 nor acts to transmit any screw feeding force. Further, although in the foregoing embodiment, the cross-section of the female screw groove 22 is designed to take a Gothic arc shape, it is not limited to such a Gothic arc shape. The same effect as in the Gothic arc shape can be attained even where a single arc is used to form the cross-section of the female screw groove 22. Furthermore, in the foregoing machining order, the machining is performed by moving the ball end mill (K) from the female screw groove 22 toward the circulation groove 24. However, the machining order may be altered so that after being infed by the target infeed depth (t) within the circulation groove 24, the ball end mill (K) is moved toward the female screw groove 22 and is escaped from the female screw groove 22 by gradually decreasing the infeed depth from a position past the joint (A). Even where the machining order is so altered, it can be realized that the angle (α) made by the boundary lines (D) between the finished surface (B) and the unfinished surface (C) on the both flanks of the female screw groove 22 becomes an acute angle.

Various features and many of the attendant advantages in the foregoing embodiments will be summarized as follows:

In the ball screw mechanism 12 in the embodiment typically shown in FIGS. 3 and 6, since the contact points (P) of each ball 21 with the female screw groove 22 gradually changes while each ball 21 moves within the joint area (E) between the female screw groove 22 and the circulation groove 24, it can be realized to prevent vibration and noise from being generated during the circulation of the balls 21.

Also in the ball screw mechanism in the embodiment typically shown in FIGS. 3 and 6, when moving along the female screw groove 22, each ball 21 is contacted with the female screw groove 22 at the two contact points (P) because of the cross-section of the female screw groove 22 taking the Gothic arc shape, so that the stress exerted on the ball 21 can be bisected and so that the screw backlash can be diminished. Further, the two contact points (P) of each ball 21 on the both flanks of the female screw groove 22 are made gradually narrower as each ball 21 approaches to the joint (A), and are converged into a single contact point (P). Thus, the delivery of each ball 21 within the joint area (E) between the female screw groove 22 and the circulation groove 24 can be done smoothly, so that it can be realized to prevent vibration and noise from being generated during the circulation of the balls 21.

In the electric power steering device in the embodiment typically shown in FIGS. 1 to 3, the ball screw mechanism 12 as constructed above is employed to prevent the generations of vibration and noise, so that the electric power steering device can be improved in the steering feeling given to the vehicle driver.

Also in the electric power steering device in the embodiment typically shown in FIGS. 1 to 3, the Gothic arc shape in the cross-section of the female screw groove 22 servers to bisect the stress exerted on the ball 21 and to diminish the screw backlash. The two contact points (P) of each ball 21 at the both flanks of the female screw groove 22 are made gradually narrower as each ball 21 approaches to the joint (A), and are converged into the single contact point (P). Thus, the delivery of each ball 21 within the joint area (E) between the female screw groove 22 and the ball circulation groove 24 can be done smoothly, so that it can be realized to prevent vibration and noise from being generated during the circulation of the balls 21.

In the machining method for the joint area (E) in the embodiment typically shown in FIGS. 3 and 4, by gradually changing the infeed depth of the ball end mill (K) into the female screw groove 22 from zero to the target depth (t) and vice versa, the acute angle ($\alpha$) can be formed by the boundary lines (D) between the finished surface (B) and the unfinished surface (C) on the flanks of the female screw grooves 22. Thus, when each ball 21 moves along the joint area (E) between the female screw groove 22 and the circulation groove 24, the contact points (P) of each ball 21 are changed gradually, so that it can be realized to prevent the generation of vibration and noise.

Obviously, further numerous modifications and variations of the present invention are possible in light of the above teachings. It is therefore to be understood that within the scope of the appended claims, the present invention may be practiced otherwise than as specifically described herein.

What is claimed is:

1. A ball screw mechanism comprising a screw shaft with a male screw groove formed on an external surface thereof; a nut with a female screw groove formed on an internal surface thereof; plural balls held in the male and female screw grooves of the screw shaft and the nut; and a ball circulation piece fit in a window portion formed in the nut and having a circulation groove formed thereon for circulating the balls;

wherein the female screw groove and the circulation groove are machined by moving a tool of a diameter equal to or larger than the diameter of the balls, along the female screw groove so that a step is eliminated at a joint between the female screw groove of the nut and the circulation groove of the ball circulation piece, and wherein an infeed depth of the tool is gradually changed as the tool is moved toward the joint so that boundary lines are formed between a machined surface and a non-machined surface on flanks of the female screw groove and the boundary lines extend at an acute angle to one another.

2. The ball screw mechanism as set forth in claim 1, wherein the female screw groove has a cross-sectional shape in the form of a Gothic arc shape.

3. The ball screw mechanism as set forth in claim 1, wherein said circulation groove has a circular cross-sectional shape.

4. The ball screw mechanism as set forth in claim 1, wherein said circulation groove has a cross-section formed of a single arc and said female screw groove has a cross-section formed of at least two arcs.

5. The ball screw mechanism as set forth in claim 4, wherein said male screw groove has a cross-section formed of at least two arcs.

6. The ball screw mechanism as set forth in claim 1, wherein said female screw groove has a cross-section shape that includes a first flank side and a second flank side, and wherein said first flank side and said second flank side have identical curvatures extending around different center points.

7. An electric power steering device incorporating a ball screw mechanism for steering steerable road wheels of a vehicle and an electric motor for operating the ball screw mechanism, the ball screw mechanism comprising a screw shaft with a male screw groove formed on an external surface thereof; a nut with a female screw groove formed on an internal surface thereof; plural balls held in the male and female screw grooves of the screw shaft and the nut; and a circulation piece fit in a window portion formed in the nut and having a circulation groove formed thereon for circulating the balls;

wherein the female screw groove and the circulation groove are machined by moving a tool of a diameter equal to or larger than the diameter of the balls, along the female screw groove so that a step is eliminated at a joint between the female screw groove of the nut and the circulation groove of the ball circulation piece, and by gradually changing the infeed depth of the tool as the tool is moved toward the joint so that boundary lines are formed between a machined surface and a non-machined surface on flanks of the female screw groove and the boundary lines extend at an acute angle to one another.

8. The electric power steering device as set forth in claim 7, wherein the female screw groove has a cross-sectional shape in the form of a Gothic arc shape.

9. The electric power steering device as set forth in claim 7, wherein said circulation groove has a circular cross-sectional shape.

10. The electric power steering device as set forth in claim 7, wherein said circulation groove has a cross-section formed of a single arc and said female screw groove has a cross-section formed of at least two arcs.

11. The electric power steering device as set forth in claim 10, wherein said male screw groove has a cross-section formed of at least two arcs.

12. The electric power steering device as set forth in claim 7, wherein said female screw groove has a cross-section shape that includes a first flank side and a second flank side, and wherein said first flank side and said second flank side have identical curvatures extending around different center points.

13. A ball screw mechanism comprising:
- a shaft having a first screw groove formed on an external surface thereof;
- a nut having a second screw groove formed on an internal surface thereof, said shaft extending through said nut, said nut having an opening through a side thereof;
- a plurality of balls provided in said first screw groove and said second screw groove; and
- a ball circulation piece provided in said opening of said nut, said ball circulation piece having a circulation groove formed configured to circulate said plurality of balls,
- wherein a machined boundary is provided on said second screw groove in an area adjacent to a joint between said second screw groove and said circulation groove, said machined boundary having boundary lines between a machined surface and a non-machined surface of said second screw groove that form an acute angle.

14. The ball screw mechanism as set forth in claim 13, wherein said second screw groove has a cross-section shape that includes a first flank side and a second flank side, and wherein said first flank side joins with said second flank side at a center point of said second screw groove.

15. The ball screw mechanism as set forth in claim 13, wherein said second screw groove has a cross-section shape that includes a first flank side and a second flank side, and wherein said first flank side and said second flank side have identical curvatures extending around different center points.

16. The ball screw mechanism as set forth in claim 13, wherein said second screw groove has a cross-section shape that includes a first flank side and a second flank side, and wherein said first flank side and said second flank side form a Gothic arc shape.

17. The ball screw mechanism as set forth in claim 13, wherein said circulation groove has a circular cross-sectional shape.

18. The ball screw mechanism as set forth in claim 13, wherein said circulation groove has a cross-section formed of a single arc and said second screw groove has a cross-section formed of at least two arcs.

19. The ball screw mechanism as set forth in claim 18, wherein said first screw groove has a cross-section formed of at least two arcs.

20. The ball screw mechanism as set forth in claim 13, wherein said boundary lines include a portion having a V-shape.

* * * * *